(No Model.)

W. D. GHARKY.
ELECTRIC CABLE.

No. 539,939. Patented May 28, 1895.

WITNESSES:
Edw. F. Ayres.
H. J. Pack

INVENTOR:
William D. Gharky
by his atty
Francis T. Chambers

United States Patent Office.

WILLIAM D. GHARKY, OF PHILADELPHIA, PENNSYLVANIA.

ELECTRIC CABLE.

SPECIFICATION forming part of Letters Patent No. 539,939, dated May 28, 1895.

Application filed October 18, 1894. Serial No. 526,235. (No model.)

*To all whom it may concern:*

Be it known that I, WILLIAM D. GHARKY, a citizen of the United States, residing in Philadelphia, county of Philadelphia, State of Pennsylvania, have invented a certain new and useful Improvement in Electric Cables, of which the following is a true and exact description, reference being had to the accompanying drawings, which form a part thereof.

My invention relates to a cable system for the transmission of electrical energy, and especially to the construction of the conducting cable therefor.

The main object of my invention is to provide a cable with a test wire which is arranged in such a manner that any cause which would operate to produce a leakage of current from the main conductor or short circuit it, will first attack the test wire, and which is also preferably of such a character that the point at which the disturbance occurs can be very definitely determined.

To this end my invention consists in providing the conducting cable which consists of a central core composed of a wire or a bundle of wires and a surrounding insulating wrapper of suitable material, with a test wire, preferably of relatively high resistance, which extends along the cable outside of the insulating wrapper or but slightly embedded in it. Preferably the test wire is wound spirally around the insulating wrapper and is provided with a light insulating covering which can be easily penetrated by moisture, and also in order to provide a metallic circuit I prefer to wind two insulated test wires around the cable, which test wires when their ends are connected will form a metallic circuit and neutralize induction. The whole cable thus formed may then be surrounded by a suitabe sheath.

My invention also consists in certain details of the construction of joint boxes or man holes, specially arranged for use with my improved cable.

My improvements can best be explained in connection with the accompanying drawings, in which—

Figure 1:
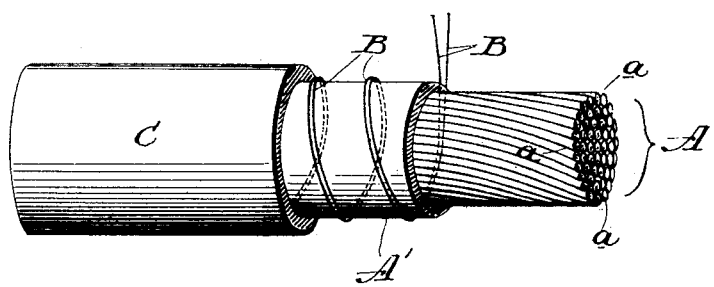
Figure 2:
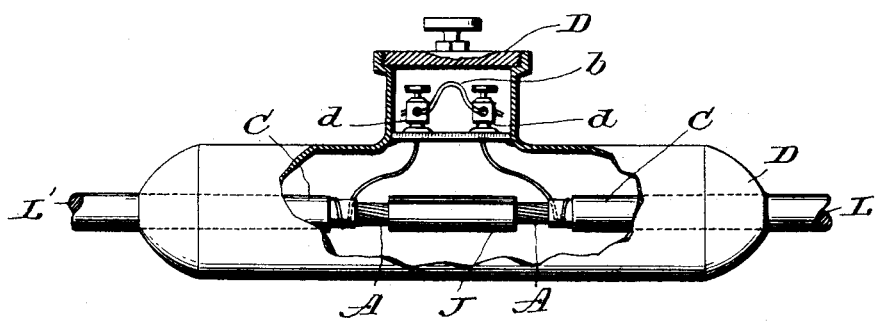
Figure 3:
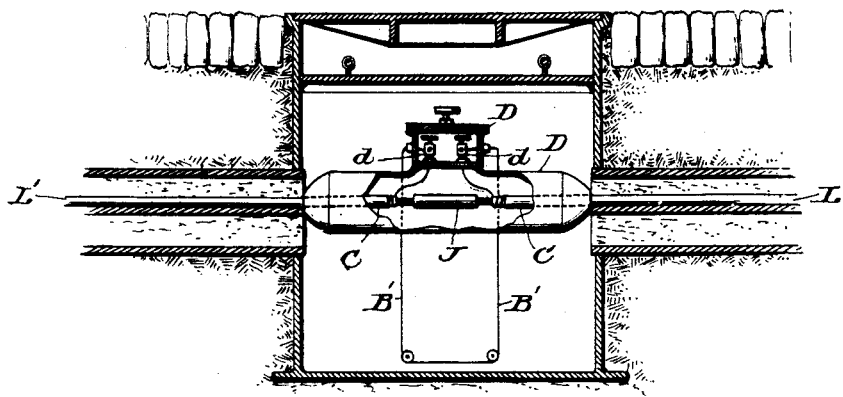

Figure 1 is a view of my improved cable. Fig. 2 is a view, partly in section, of a joint-box, showing a convenient construction whereby certain lengths of the test-wire can be tested to more exactly locate a leakage of current. Fig. 3 shows another application of my improved cable.

A is the conducting core of the cable and may very conveniently be formed of a bundle of wires $a$ $a$ of copper or other metal of high conductivity.

A' indicates the insulating wrapper for the conducting core.

B is the test wire which is preferably of high resistance relatively to the core A. A thin iron or steel wire or ribbon serves this purpose very well, though a fine wire of copper can of course be employed if desired.

The test wire B may be laid parallel to the conductor A outside of or slightly embedded in the wrapper A' but I much prefer to wind it spirally around this wrapper as indicated, and in order to obtain a metallic testing circuit for the testing instruments I prefer to provide two wires wound together as before stated.

The wire B is preferably covered with a light fibrous insulation which will be easily penetrated by moisture. The whole cable may be protected by a suitable sheath C of lead or other suitable material.

In operation should a break occur or moisture penetrate the outside sheath the test wire would be first attacked, and by a suitable testing instrument the position of the break would be approximately located. By twisting the test wire around the cable in the manner shown, it is obvious that the location of the injury can be even more accurately located as the resistance is thus materially increased for any given length of cable. As the test wire lies outside of the insulating cover of the core it is in case of injury to the outer cover attacked before the core is injured, and in most cases the damage can be repaired before the core has suffered harm.

I wish here to note that the test wire can be outside of the wrapper A' or slightly embedded in it, and when in the claims I speak of the test wires as outside of the wrapper I mean outside of that part of the insulating wrapper which is just on the surface of the inner core A and not of necessity outside of the entire insulating wrapper which protects this inner core, the object being that moisture or other damage which operates from outside the conductor shall attack the test wire first, I prefer, however, instead of embedding the test wire in the wrapper A' to wind the test wire insulated as described around the outside of the wrapper A' as shown.

In Fig. 2 L, L', are two lengths of cable which are connected by a point J in a suitable box, D. $d\,d$ are terminals in said box to which are secured the ends of the test wires which accompany the cables, $b$ indicating a short length of wire which usually connects these terminals. If an injury is indicated on the test wire its location can be approximately located at the station and the operator can go to these joint boxes near the spot indicated, and on removing the cover D', can easily disconnect and try the test wire to ascertain the particular length where the break has occurred, thus rapidly and exactly locating it, and this test can be made without in any way interfering with the main conductor.

The test wire may also be provided with a loop as indicated at B' Fig. 3 extending down to near the bottom of man holes or junction boxes as E, which loop will be grounded on the accumulation of water in these man holes or boxes, in quantity sufficient to come in contact with it and this grounding could be easily located by ordinary tests, and the water removed before any damage is done. This arrangement is unnecessary where lead covered cables are used but of considerable value where the main cable or wire is inclosed in a fixed non-conducting conduit the flooding of which it is necessary to prevent.

Having now described my invention, what I claim as new, and desire to secure by Letters Patent, is—

1. The combination with a cable for the transmission of electrical energy consisting of a conductor or conductors forming a core and an insulating wrapper surrounding the core, of a testing wire extending along the cable outside of the insulating wrapper.

2. The combination with a cable for the transmission of electrical energy consisting of a conductor or conductors forming a core and an insulating wrapper surrounding the core, of a testing wire wound spirally around the cable outside of the insulating wrapper.

3. The combination with a cable for the transmission of electrical energy consisting of a conductor or conductors forming a core and an insulating wrapper surrounding the core of a testing wire covered with a light insulating cover and wound spirally around the cable outside of the insulating wrapper.

4. The combination with a cable for the transmission of electrical energy consisting of a conductor or conductors forming a core and an insulating wrapper surrounding the core of two or more test wires each covered with a light insulating cover wound together spirally around the cable outside of the insulating wrapper, so that a metallic testing circuit can be formed.

5. A cable for the transmission of an electric current, consisting of a conductor or conductors forming a core A an insulating wrapper A' around said core, an insulated testing wire B wound spirally around the wrapper A' and a sheath C surrounding the insulated core and the test wire.

6. In a cable system for the transmission of electrical energy, a cable consisting of a core A an insulating wrapper A' surrounding it and a test wire extending along the cable and secured thereto, outside of the wrapper A', and a joint box D having suitable terminals $d\,d$ therein to which are secured the adjacent ends of two lengths of test wire substantially for the purpose specified.

7. In a cable system for the transmission of electrical energy, a cable as A, a test wire extending along the cable but separated from it by insulating material a man hole or junction box E through which the cable passes and a loop B' forming part of the test wire extending to near the bottom of the man hole substantially as and for the purpose specified.

WM. D. GHARKY.

Witnesses:
ROBERT W. LLOYD,
EDW. F. AYRES.